(No Model.)
A. H. HATMAKER.
TREE PROTECTOR.
No. 309,046. Patented Dec. 9, 1884.
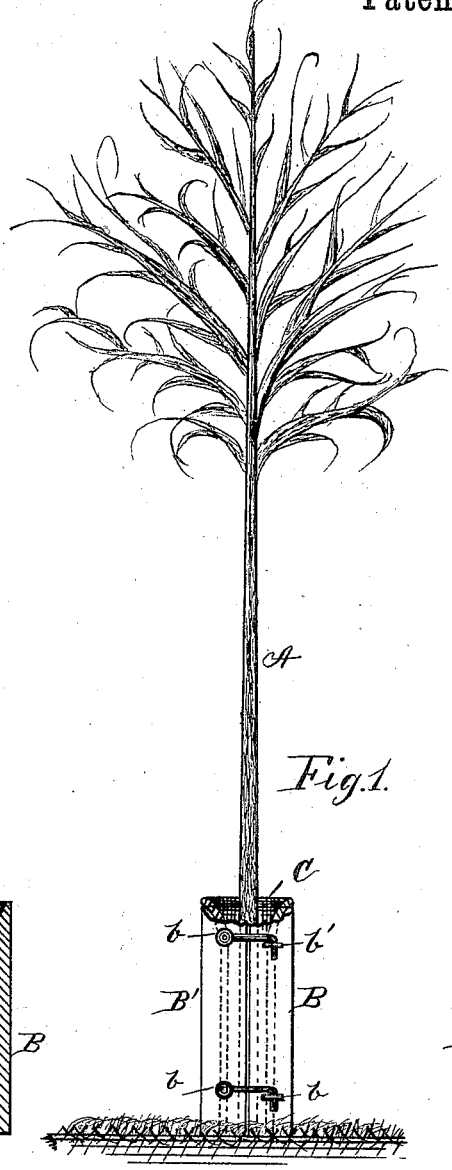

UNITED STATES PATENT OFFICE.

ADAM H. HATMAKER, OF IUKA, ILLINOIS.

TREE-PROTECTOR.

SPECIFICATION forming part of Letters Patent No. 309,046, dated December 9, 1884.

Application filed April 29, 1884. (No model.)

*To all whom it may concern:*

Be it known that I, ADAM H. HATMAKER, a citizen of the United States, residing at Iuka, in the county of Marion and State of Illinois, have invented certain new and useful Improvements in Tree-Protectors; and I do hereby declare the following to be a full, clear, and exact description of the invention, such as will enable others skilled in the art to which it appertains to make and use the same.

The object of this improvement is to furnish a cheaply-constructed and efficient protector for young fruit-trees, that can be easily applied around the trees, and as conveniently removed, when desired, and that will not only prevent the ravages of rabbits, but will also prevent the bark from being bruised by swaying of the tree in the wind, and the bark on their trunks from being burst by cold and freezing weather. These results are attained by the mechanism illustrated in the drawings herewith filed as part of the specification, in which the same letters of reference denote the same parts in all the views.

Figure 1 represents the application of my improvement to a young tree. Fig. 2 illustrates the interior of the protector with one of the parts removed. Fig. 3 is a sectional view with one of the parts removed. Fig. 4 is a transverse section showing a slight modification in the construction of the main body of the protector.

A represents the tree. B B' represent the protector, the main body of which is comprised of two parts made of oblong square pieces of wood, each provided with a lining, C, to be of woolly sheepskin or other soft suitable substance for preventing injury to the bark of the tree, which would otherwise accrue from the tree swaying to and fro by the force of the wind.

In Figs. 2 and 3 the semicircular flared recesses of the sections B B' are represented without the lining C. The parts B B' are joined together in the rear by any suitable hinges, and are provided in front with hooks $b$ and staples $b'$, by means of which the sections B B' are secured together around the tree, as shown in Fig. 1. The sections B B' may be made of pieces 1, 2, 3, 4, 5, and 6, diagonally joined at the corners, as shown in Fig. 4. The lining C may extend from the top of the protector to the ground, or it may be applied as far down as may prove desirable. The sections B B' are to be well provided with paint, to prevent their decay from the effects of the weather.

By the means shown young trees will be fully protected, not only from the ravages of rabbits and bruising of the bark from stress of the wind, but also from the effects of cold freezing weather, and against injury from contact with agricultural implements used for cultivating the ground around the trees.

The protecters should be made from fourteen to eighteen inches high, and the inner recess should be large enough to give from one and a quarter to two inches space for the body of the tree.

Having explained the construction and operation of my improvement, what I claim as new, and desire to secure by Letters Patent, is—

The combination, in a plant and tree protector, of the solid parts B B', hinged together, as described, and recessed to present conjointly a central opening, yielding lining C, adapted to rest in said opening, and fastening devices designed to hold said sections B B', substantially as set forth.

In testimony whereof I affix my signature in presence of two witnesses.

ADAM H. HATMAKER.

Witnesses:
 H. C. MOORE,
 D. W. PATTERSON.